United States Patent [19]
Kannegundla et al.

[11] Patent Number: 5,530,475
[45] Date of Patent: Jun. 25, 1996

[54] IMAGE SENSOR WITH OVERSIZED VERTICAL SHIFT REGISTERS FOR MARKER PIXEL GENERATION

[75] Inventors: Ram Kannegundla; Charles V. Stancampiano, both of Rochester, N.Y.

[73] Assignee: Eastman Kodak Company, Rochester, N.Y.

[21] Appl. No.: 346,723

[22] Filed: Nov. 30, 1994

[51] Int. Cl.$^6$ .................................................. H04N 5/335
[52] U.S. Cl. ........................ 348/322; 348/311; 348/313; 257/232
[58] Field of Search ..................... 348/302–305, 348/310, 311, 313, 315–317, 319–324, 294, 371, 375, 376, 377, 378, 379; 257/231, 232; H04N 5/335

[56] References Cited

U.S. PATENT DOCUMENTS

| | | | |
|---|---|---|---|
| 4,617,595 | 10/1986 | Berger | 358/213 |
| 4,638,362 | 1/1987 | Oshima et al. | 358/213 |
| 4,647,978 | 3/1987 | Kinoshita et al. | 358/213 |
| 4,649,430 | 3/1987 | Hynecek | 358/213 |
| 4,675,549 | 6/1987 | Steffe et al. | 307/371 |
| 4,686,573 | 8/1987 | Murayama et al. | 358/213.22 |
| 4,733,302 | 3/1988 | Kinoshita et al. | 358/213 |
| 4,837,630 | 6/1989 | Ueda | 358/213.26 |
| 4,862,275 | 8/1989 | Meisenzahl | 358/213 |
| 5,040,071 | 8/1991 | Stevens | 358/213 |
| 5,093,849 | 3/1992 | Goto | 377/60 |
| 5,105,450 | 4/1992 | Yamada | 377/58 |
| 5,109,440 | 4/1992 | Kawahara et al. | 382/67 |
| 5,113,365 | 5/1992 | Yang | 364/807 |
| 5,286,990 | 2/1994 | Hynecek | 257/247 |
| 5,430,481 | 7/1995 | Hynecek | 348/317 |
| 5,483,283 | 1/1996 | Kannegundla | 348/312 |

*Primary Examiner*—Joseph Mancuso
*Assistant Examiner*—Ngoc-Yen Vu
*Attorney, Agent, or Firm*—James D. Leimbach

[57] ABSTRACT

A method and apparatus for generating timing signals within the sensor in an imaging system by making provisions internally within a sensor that allows the sensor to generate the timing signals which are then output to the system to control the image sensor timing This alleviates the system from the responsibility of counting pixels and lines. The sensor will give at predetermined times, outputs which have the same wave form as the normal video output but with a much higher amplitude than the maximum video output recognized by the image processing system. These output signals will identify the end of the line and likewise will identify the end of the frame (or field). The resulting sensor can maintain its own timing sequence accurately tracking the time for lines and frame readout.

14 Claims, 6 Drawing Sheets

IMAGE SENSOR WITH OVERSIZED VERTICAL SHIFT REGISTERS FOR MARKER PIXEL GENERATION

FIELD OF INVENTION

The present invention relates to Charge Coupled Devices (CCDs), and more particularly, to CCDs that have marker pixels used to identify timing parameters.

BACKGROUND OF THE INVENTION

Charge coupled devices, often referred to as "CCDs", are used in various fields such as solid state imaging, analog signal processing, and memories for both analog and digital signals. An interline CCD sensor has an image sensing area, and at least one horizontal shift register. The image sensing area has independent photosites that convert incident light into electrons which are transferred into vertical shift register cells adjacent to the photosites upon application of a clock signal. A clock pulse employed on the vertical registers has three potential levels. The first and second clock levels are alternately applied to the vertical CCD to transfer charge along the vertical CCD and from the vertical CCD to a horizontal CCD that is adjacent to the image sensing area. The third level on the clock assists the movement of charge from the photo cites to the vertical CCD.

Horizontal clocks move the charge from the horizontal CCD to a floating diffusion. A buffer amplifier on the CCD sensor is used to sense the voltage of the floating diffusion on which the charge from horizontal shift registers is transferred and provides an output signal from the device to external circuits. The floating diffusion is reset before the charge is transferred by the next horizontal clock cycle. The output of the output amplifier is processed by a sample and hold circuit and compared to the precharge level of the floating diffusion. This difference is proportional to the intensity of the light falling on the object and will eventually become video.

In order to construct a video camera, the number of pixels per line and the rate of clocking of the pixels and the number of lines per frame and the rate of clocking of the lines should be controlled. This control is normally accomplished by timing logic external to the sensor. The output from these cameras can easily be seen on a standard TV monitor if the clocking time of the sensor abides by the NTSC standards. The designers of the sensors are well aware of this fact and hence they predetermine the number of pixels and the number of lines on the sensor to meet the standards. The number of pixels per line, the number of lines on the sensor, the clocking speed of pixels and the clocking speed of lines is normally based on a) the frame rate at which the sensor is emptied, and b) the resolution of the image the application demands. For NTSC standards the number of pixels per line is based on the subcarrier frequency. The clocking speed of pixels is normally an integral multiple of the subcarrier frequency which is 3.5795 MHz. Thus the clocking speed of pixels for sensors designed for NTSC standards generally has been 3.5795 MHz, 7.1591 MHz, 10.7386 MHz or 14.3182 MHz depending on the resolution of the sensor. The number of lines for all NTSC standard sensors has also been fixed.

In order to satisfy the timing requirements, many companies typically develop a full custom timing chip in parallel with the development of a sensor device. The investment for the development of this timing chip represents a considerable cost in addition to the development of the sensor. There remains a need within the prior art for a sensor device that alleviates this additional cost.

SUMMARY OF THE INVENTION

The present invention teaches a new approach to the design of sensors, wherein, the sensor provides end of line and end of frame indications within the video output signal by incorporating additional structure on the sensor device that provides markers used to generate the imager timing. These markers identify the end of line and end of frame (or end of field for an interlaced device). Modifications to the design yield a marker output having essentially the same output wave form as normal video output, but with a very high amplitude compared to the normal maximum video output of the sensor. This will identify the end of the line and likewise will identify the end of the frame (or field). By making such a provision internal to the sensor, the sensor can be operated with minimal external logic. Furthermore, these marker signals within the sensor output simplify the system logic and result in a sensor that has the ability to count pixels and lines, thus, relieving the system design of this burden.

It is an object of the invention to provide an approach to sensor design, wherein, the sensor itself provides identification of end of line and end of frame conditions.

It is further an object of the invention to simplify the system logic design by teaching a system wherein the sensor counts pixels and lines by itself.

The above and other objects of the present invention will become more apparent when taken in conjunction with the following description and drawings wherein like characters indicate like parts and which drawings form a part of the present invention.

DETAILED DESCRIPTION OF THE INVENTION

The concept of present invention is to eliminate part of the logic block of the sensor system by incorporating additional structure on the device that provides markers used to generate the imager timing. These markers identify the end of line and end of frame (or end of field for an interlaced device). Modifications to the design give an output which has essentially the same output wave form as the normal video output, but, very high in amplitude compared to the normal maximum video output of the sensor even when it is exposed to a very bright scene. This will identify the end of the line and likewise will identify the end of the frame (or field). By making such a provision internal to the sensor, the sensor can be operated with minimal external logic. Furthermore, the present invention eliminates the requirement for counting the individual pixels while still maintaining a precise timing sequence by providing for the identification of lines and frames. Conventional image sensing devices require external logic for this identification. Additionally, the external logic that is required remains the same even if the sensor pixel count is varied.

Figure 1:
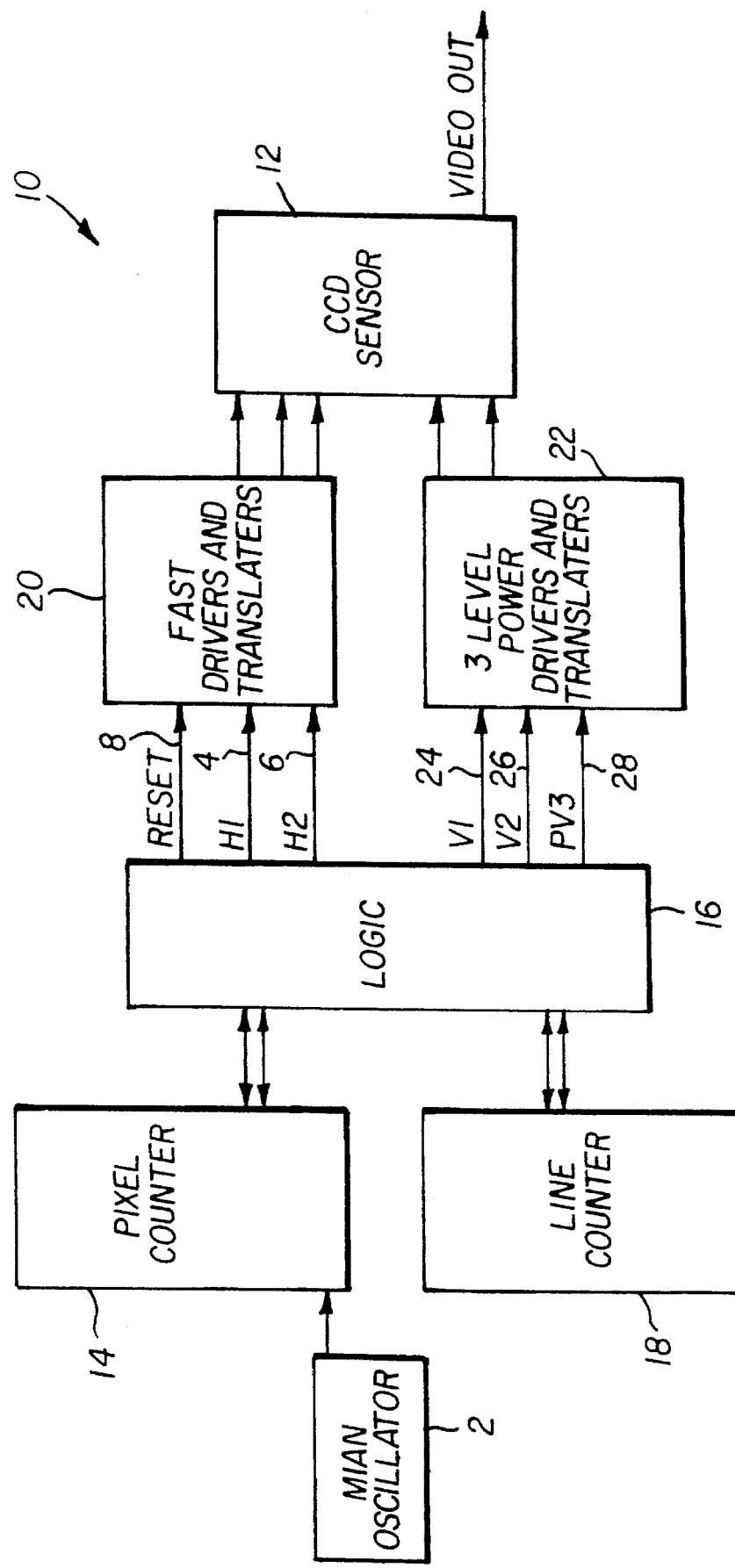
FIG. 1 is a block diagram of a Prior Art CCD based image sensing system.

Referring to FIG. 1, a conventional image sensor system 10 is configured having a main oscillator 2 that is chosen in accordance with the pixel clocking speed of the Charge Coupled Device (CCD) 12. The oscillator 2 generates the clocks that enable pixel counter 14 to provide a count of the number of pixels received from CCD 12. The binary outputs of pixel counter 14 are fed to logic circuit 16 which will reset the pixel counter 14 after reaching a terminal count for the number of pixels in a given line. Logic circuit 16 then generates a signal to increment the line counter 18. Line counter 18 is preset to count to a predetermined number of lines at which point it is reset by logic circuit 16. Logic circuit 16 also generates the signals necessary to provide horizontal clocking signals H1, and H2 (4 and 6), vertical clocking signals V1, V2 and PV3 (24, 26, and 28) and the reset signal 8 for the sensor system 10. Horizontal clocking signals H1 and H2 (4 and 6) pass through the horizontal driver/translator circuit 20 to shift the voltage levels of these signals to the proper values for use by the CCD 12. In a similar fashion, vertical driver/translators receive the vertical clocking signals V1, V2 and PV3 (24, 26 and 28), and produce three level clock signals in a form that is usable by CCD 12. The clocking sequence is periodic and repeats for every line in every frame. The number of inputs to logic circuit 16 can be high, sometimes as high as 24 wires, thus causing the whole timing logic to be a complex and expensive part of the image sensor system 10. Many companies develop a full custom timing chip in parallel with the development of a sensor. There is considerable investment in the development of such a timing chip.

Figure 2:
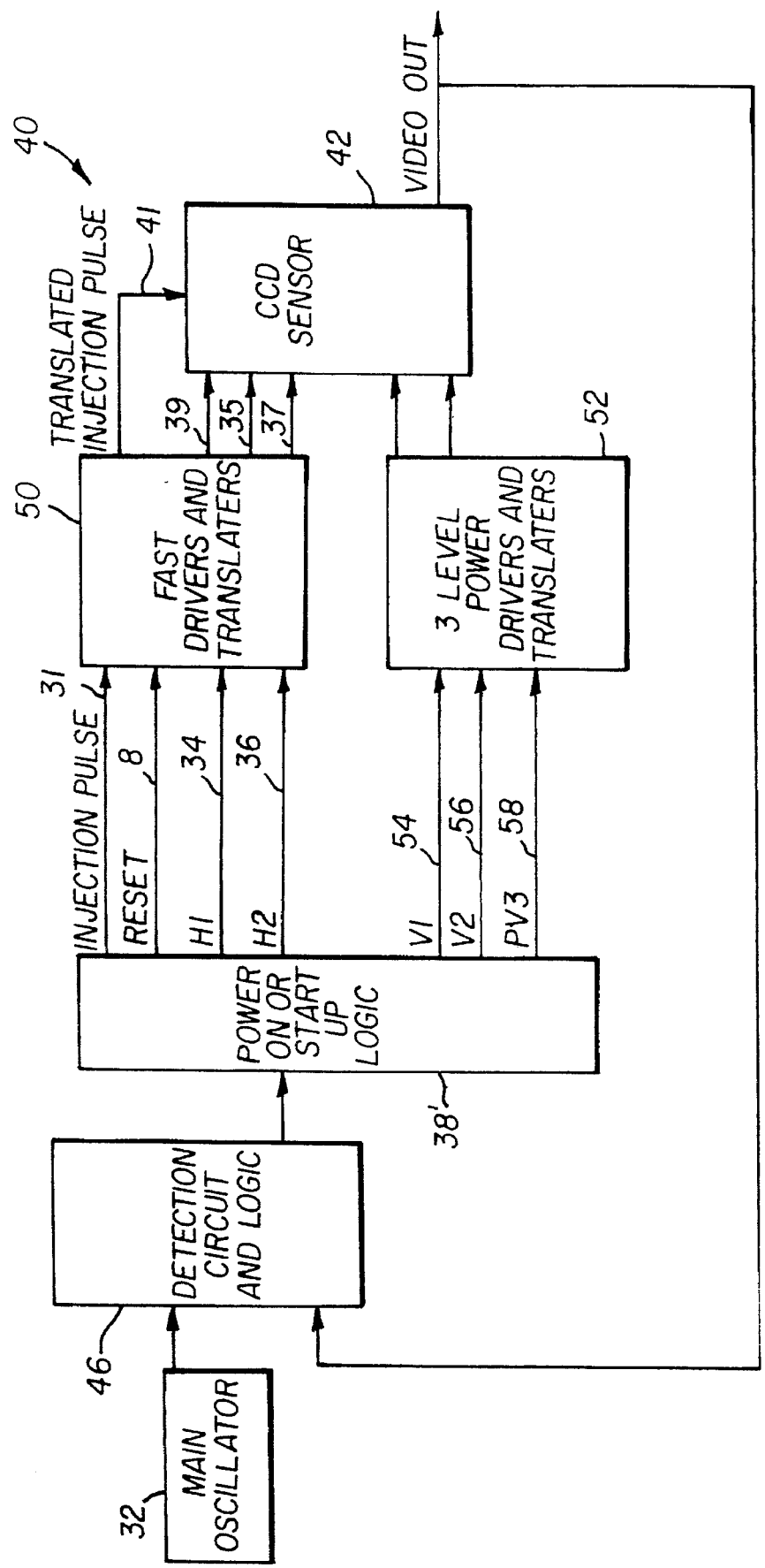
FIG. 2 is a block diagram of the CCD based image sensor of the present invention.

The present invention seeks to solve the shortcomings in the prior art with a new approach to image sensor design. Referring to FIG. 2, the logic required to implement an image sensor system 40 is shown wherein the CCD sensor 42 itself provides indicators for end of line and for end of frame within the video output signal. These indicators are marker signals generated from within the sensor that can simplify the design of the system logic by providing signals necessary for identifying the end of line and end of frame conditions. This then makes external logic for counting individual pixels and lines unnecessary. The present invention creates the end of line and end of frame (or field) within a CCD sensor such that they can be interpreted by external logic at the sensor's output. This creates an image sensing system requiring simplified external logic. Apart from simplifying the logic, this external logic is adaptable for all CCD devices which employ the concepts taught by the present invention. Two methods of implementing the present invention within a CCD sensor are presented, hereinbelow.

The video output from the image sensor system 40 as shown in FIG. 2 is shown in FIG. 3. Here, the CCD sensor 42 has been fabricated as a standard 2:1 interlaced device with an antiblooming structure. A single pixel of completely saturated charge would result in a video output signal similar to video pixel 68 shown in FIG. 3a. This is clearly distinguishable from the black level pixel 66. The saturated pixel 68 and the black level pixel 66 are the typical pixel types produced from conventional CCD sensors. The present invention envisions creating a marker pixel 70, as shown in FIG. 3b, for indicating the end of line condition. The preferred embodiment envisions that a marker pixel would have a video output that is much larger than typically achieved from the saturated video pixel 68 in FIG. 3a, in order to make detection of the marker pixel a relatively simple matter.

Figure 3A:
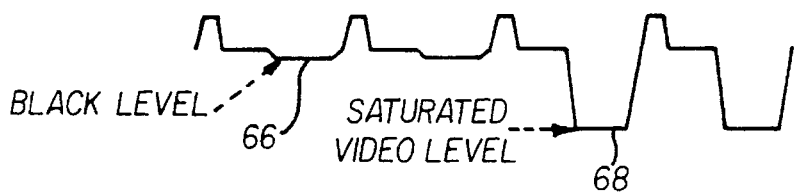
FIG. 3a is a diagram of the video output from a sensor with two bright and two dark pixels.
Figure 3B:
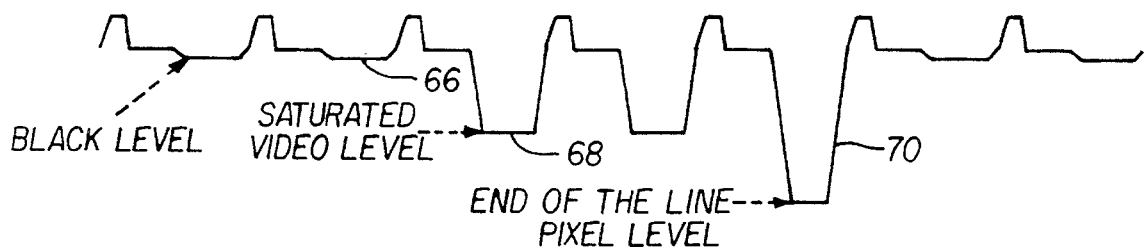
FIG. 3b is a diagram of the video output from a sensor similar to FIG. 3a with an additional end of line pixel.
Figure 3C:
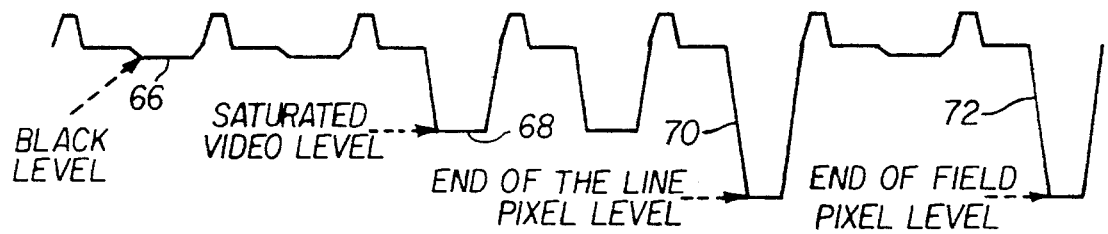
FIG. 3c is a diagram of the video output similar to FIG. 3b indicating the end of field one.
Figure 3D:
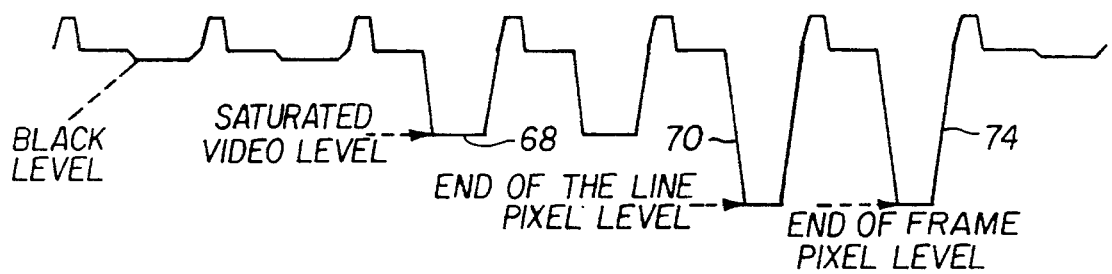
FIG. 3d is a diagram of the video output similar to FIG. 3b at the end of field two.

In a similar manner the end of field pixel 72 in FIG. 3c can be readily detected. The encoding technique envisioned by the present invention is illustrated by comparing FIG. 3c and FIG. 3d as follows. The end of field pixel 72 within FIG. 3c occurs two pixel periods after the end of line pixel 70. The present invention makes it a relatively simple matter for system logic designers to create system logic which can interpret the black pixel level that occurs prior to the end of line pixel 70 and the end of field pixel 72 and thus identify this sequence of events to be the occurrence of an end of field 1 condition in an interlaced system. Referring to FIG. 3d, the end of field 2 is clearly distinguishable from the end of field 1 by having the end of frame 74 occur immediately after the end of line 70 within a single pixel period. The CCD sensor 42 could be designed to reverse the encoding of end of frame 1 and end of frame 2, with a corresponding change in the logic used to identify these conditions. Other coding schemes are equally feasible. It is important to remember that it is necessary to provide marker pixels that can be identified to indicate the desired condition.

The detection logic circuit 46 in FIG. 2 informs the logic circuit block 38 upon the occurrence of any of the end of the line or the end of the frame pixels generated by CCD sensor 42. Here it is important to note that the circuit elements required to make detection logic circuit 46, as shown in FIG. 2, are many times simpler than the elements required to make logic circuit 16 shown in FIG. 1. Preferably the detection logic circuit 46 would comprise an analog comparator circuit that is capable of indicating when the large voltage indicating a marker pixel occurs. Numerous variations on this part of the circuit logic will be obvious to those skilled in the art of circuit design.

Logic circuit 38 will in turn generate the necessary horizontal clock signals H1 and H2 (34 and 36), vertical clock signals V1, V2, and the third level clock signal PV3 (54, 56 and 58) as well as the reset signal 48 for the CCD sensor 40 in accordance with the detection of marker signals by the detection circuit 46. It should be noted that third level clock signals PV3 (54, 56 and 58) have the same overall timing characteristics as there vertical clocking signal counterparts within the diagram of FIG. 1, V1, V2 and PV3 (respectively 4,6 and 8) as well as the same overall function but are actually generated differently by the present invention.

It should be noted that during the time the sensor is powered down the imager photo diodes and CCDs are completely filled with electrons that have accumulated as a result of dark current. The imager output immediately after being turned on is meaningless due to this accumulated dark current. Hence, the preferred embodiment envisions that a power on sequence is needed to establish continuous vertical and horizontal clock signals immediately after the sensor system is turned on to flush out the unwanted pixels from the sensor. The power on logic 38 as shown in FIG. 2 has a timer that allows continuous vertical and horizontal clock signals to be generated and applied to the sensor during the time period the timer is set for during start up periods. Immediately after the start up timer has expired, the timing for the sensor assumes normal operation and an initial injection pulse is applied to the sensor establishing a sequence as described above.

Figure 4:
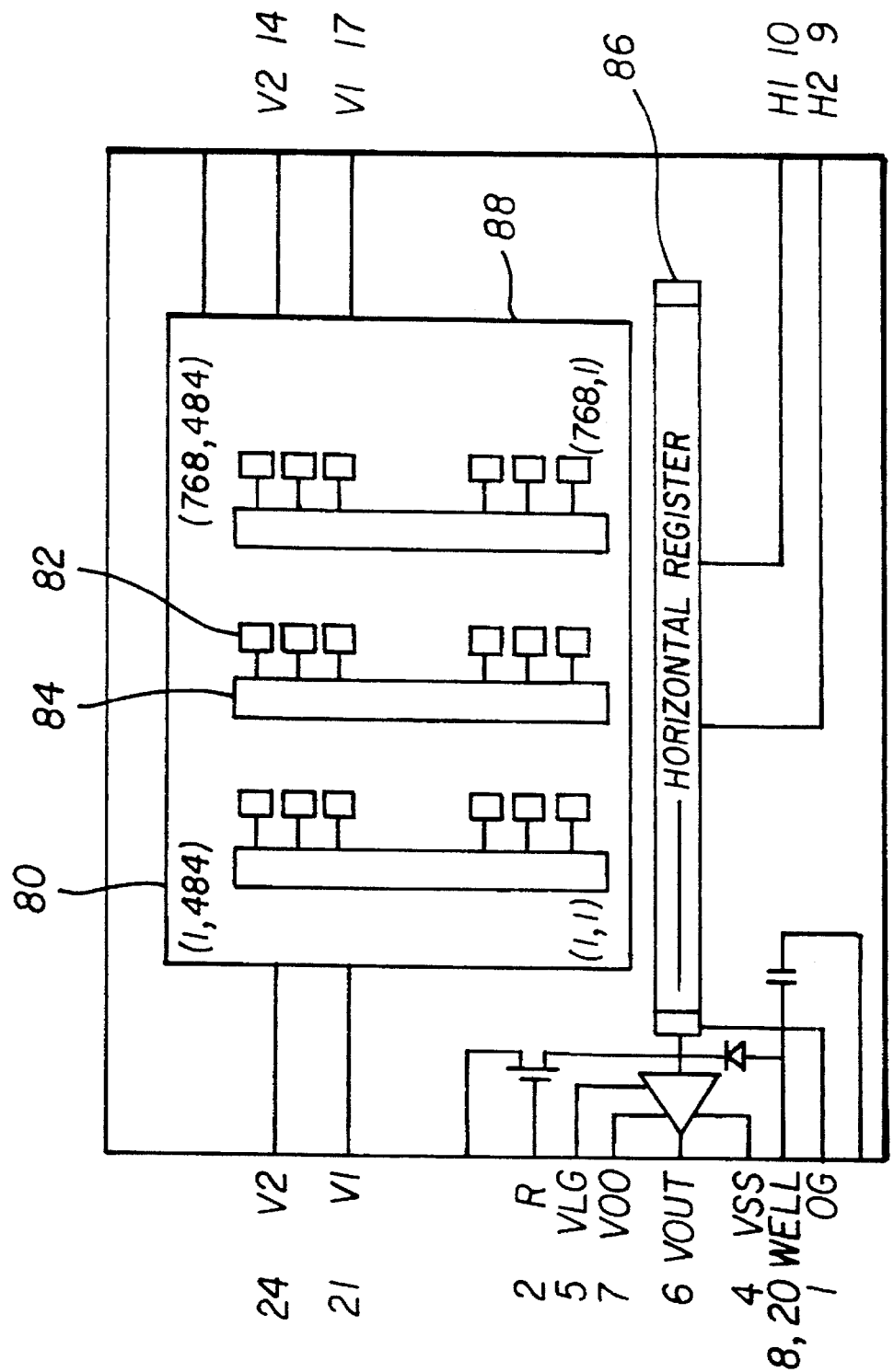
FIG. 4 is a diagram of a CCD sensor as used within the prior art.

FIG. 4 is a block diagram of a typical interline video sensor having image sensing section 80 with photodiodes 82 that transfer charge into vertical shift registers 84. The charges are then transferred into horizontal shift register 86. The sensor device within the preferred embodiment possess ten pixels per line which are covered with a light shield 88 which gives a black reference level for signal processing.

Figure 5:
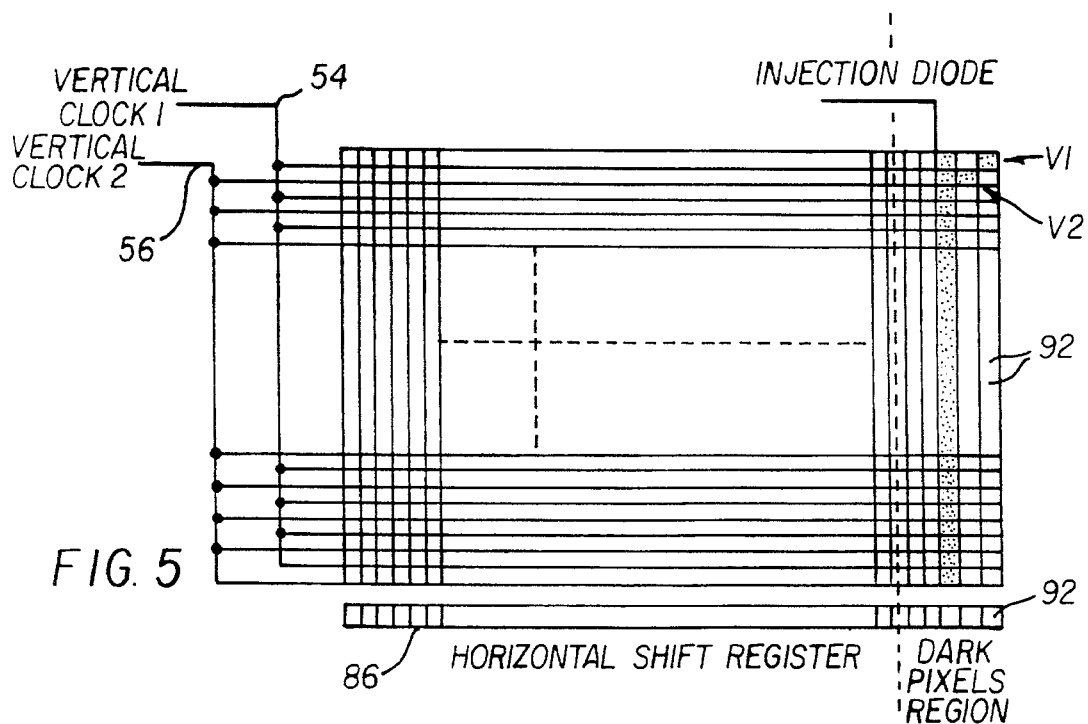
FIG. 5 is a diagram of a CCD that illustrates the method of making marker pixels within the context of the present invention.

Referring now to FIG. 5 which illustrates the methodology envisioned for implementing markers on CCD sensor 42, the end of line marker pixel 70 is contained within the third from last column on the right, as shown in FIG. 5. The marker pixel within the preferred embodiment is constructed by having the register in which it is generated use double the width of the normal vertical shift register. The actual construction technique for double width registers 92 is the same as a conventional vertical shift register. The horizontal shift register 86 in FIG. 5 must be constructed with sufficient charge capacity to contain the charge from the double-width vertical registers.

Still referring to FIG. 5, the shaded area represents the areas that function as marker pixel generation sites. Each of these areas has charge injected via an injection diode which is brought out to an external terminal and can be biased in such a way as to dump charge into the corresponding marker pixel when the third level vertical clock potential appears on the sensor. Using the example of an interlaced interline sensor with two fields (1 and 2) that are read out by third level clocks on V1 and V2, we can construct the marker pixel generation sites so that application of a third level pulse to the appropriate vertical phase injects charge via a fill and spill mechanism into the double width CCDs at the same time that photo charge is being transferred from the photodiodes to the conventional vertical CCDs.

Figure 6A:
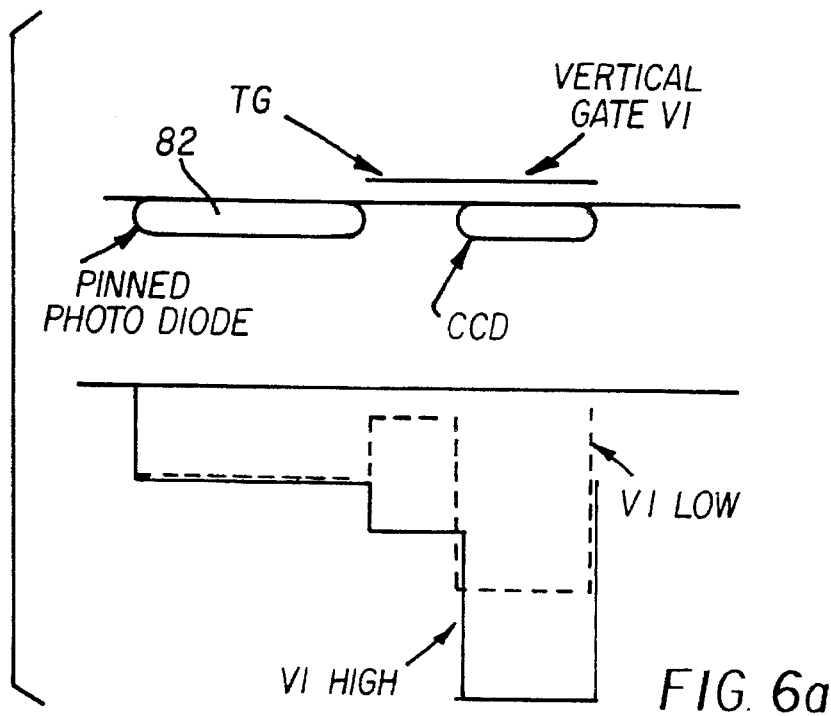
FIG. 6a is a diagram illustrating the potential distribution in a normal active pixel.
Figure 6B:
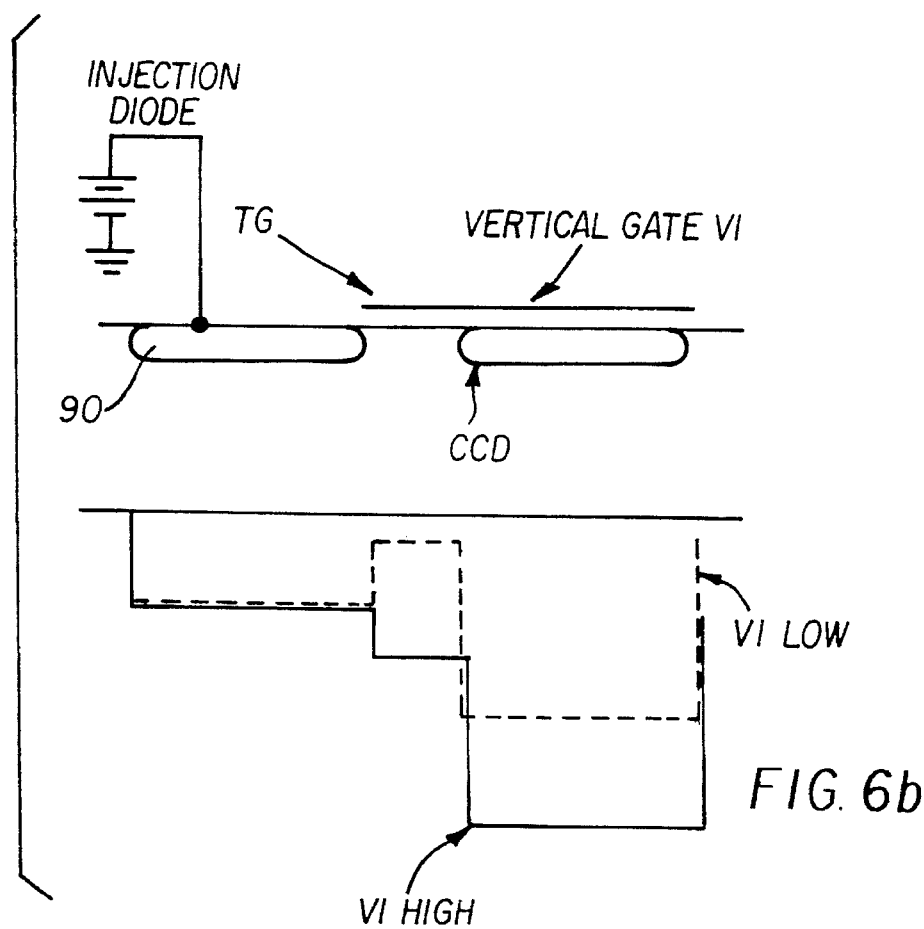
FIG. 6b is a diagram illustrating the potential distribution in a marker pixel.

The marker pixel structure is a design in which the CCD is manufactured to retain a charge that is measurably larger than that of typical pixels. In the preferred embodiment of the present invention, the marker pixel is designed to retain twice the charge of a normal active pixel. This is accomplished by designing the vertical shift registers to be twice the width of the vertical shift registers intended to hold the normal pixels. This relationship is shown in comparing FIG. 6a with FIG. 6b. The potential diagrams FIG. 6b explain the operation of the shaded pixels as shown in FIG. 5. The output derived from these shaded pixels is much larger than the saturated video output from the normal pixels within the rest of the sensor. It should be noted that other register designs will be readily apparent from preferred embodiment of the present invention. It is not essential to the present invention that the registers holding the marker pixels be double width as taught by the present invention. Different sizes than those used by the preferred embodiment could be used to create the marker pixels. Varying amounts of doping within semiconductors could be used to increase charge capacity, yielding pixel storage areas having increased storage capacity.

The marker pixels of the present invention are filled with charge from injection diode 90. The third level on the V1 clock is used to transfer charge of the marker pixels that are connected to the V1 clock. Thus the video output from the sensor for the end of each line will be as shown in FIG. 3b and video output from the sensor for the end of field one is as shown in FIG. 3c. Upon the application of the third level on the V2 clock, all the marker pixels connected to the V2 clock are filled with charge due to the injection diode. Thus the video output from the sensor for the end of field one is as shown in FIG. 3d. With a simple output detection circuit one can generate V1, V2 signals for the line transfer and PV3 for the frame or field transfer. Additionally, generation of the horizontal clock signals can be accomplished with very few gates. Another advantage is the ability to run such a sensor with a different number of pixels and a different number of lines in a single sensor system without the requirement of programming timing signals.

The above embodiment describes creating marker pixels with extra wide vertical shift registers to accommodate the additional charge required to distinguish the marker pixels from other pixels. However, it is also envisioned that various alternatives can be employed to accomplish the intended purpose of increasing the charge capacity of individual registers. Among these alternatives are prior art techniques such as using modified doping profiles and thin gate oxides to increase the charge capacity of the desired registers.

Figure 7:
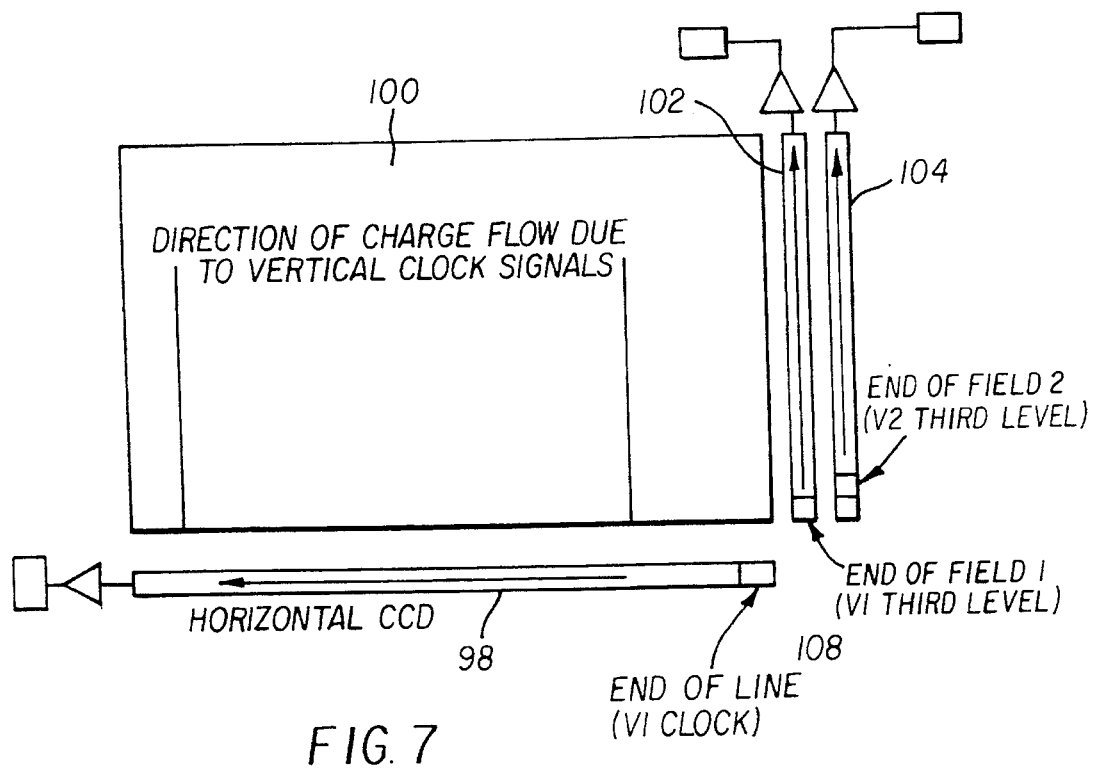
FIG. 7 is an illustration for an alternative embodiment for creating marker pixels.

As explained previously, similar results can be accomplished by employing the concept of the present invention with a different sensor design. The concept of the present invention is applicable to numerous embodiments and not only the specific implementation scheme employed by any single embodiment. A second embodiment is shown in FIG. 7. Here, there are two extra columns (102 and 104) that are placed within CCD sensor 100 for generating and transporting the field indicator markers. These markers do not follow the pixels representing the image, but instead are output along separate path to individual pads on CCD sensor 100. Here, a separate vertical register is not required for the end of line pixel. External logic is further simplified by having separate output signal lines for end of line, end of field 1 and end of field 2.

There are three injection diodes present on CCD sensor 100. A first photodiode 108 is placed at the right extreme end of the horizontal CCD 98 which will fill the right most well of the horizontal CCD 98 using the V1 clock. After each line of image data is clocked out of horizontal register, this end of line pixel will indicate that all of the pixels for that line have been clocked out. The two field markers for the end of field 1 and end of field 2 are created on the two extra wide columns (102 and 104) at the right side of the imager as shown in FIG. 7. One of the markers is filled with charge through an injection diode upon the third level signal on the V1 clock. Similarly the other markers are filled with charge by injection diodes upon the third level signal occurring on the V2 clock. Each of these markers is advanced toward its output every time a vertical CCD shift is performed and an end of line marker pixel is detected. Using this design, the signal detection circuit in the external circuitry becomes even simpler at the expense of greater on chip complexity.

It should be noted that various attributes from the embodiment shown in FIG. 7 can be interchanged with the previous embodiment to arrive at additional embodiments. The end of line marker pixel in FIG. 7 requires no additional vertical shift register. This feature could easily be incorporated into the previous embodiment. Also, markers having individual output pads, as shown in FIG. 7, could be incorporated into the previous embodiment. Additionally, features of the previous embodiment could be incorporated into the embodiment as shown in FIG. 7.

The present invention is a versatile concept that can be employed on various sensor designs. There exist high resolution, medium resolution and low resolution interline transfer, frame transfer and linear CCD sensors available in the market. The users choose the type depending upon their specific requirements. A very high resolution, megapixel, interline transfer sensor could conceivably have two outputs and still be used in a single line transfer mode or a two line transfer mode. Each of these combinations demand that separate timing logic be employed that is specific for each sensor type. The requirements for either a custom timing chip or a general purpose timing FPLA, necessary to generate the timing to run the sensor according to the designed specification and for the customer application adds a significant cost to the sensor system and increases the time required for sensor system development.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Parts List 2 main oscillator
4 H1
6 H2
8 reset signal
10 image sensor
12 CCD
14 pixel counter
16 logic circuit
18 line counter
20 horizontal drivers
24 V1
26 V2
28 PV3
34 H1
36 H2
38 logic circuit block
40 image sensor
42 CCD sensor
46 logic & detection circuit
48 reset signal
54 V1
56 V2
58 PV3
66 black level pixel
68 saturated video pixel
70 end of line
72 end of frame 1
74 end of frame 2
80 image sensing section
82 photodiodes
84 vertical shift register
86 horizontal shift register
88 light shield
90 injection diode
92 double wide register
98 CCD
100 CCD sensor
102 extra column
104 extra column
108 photodiode

We claim:

1. A method of creating marker pixels within an image sensor comprising the steps creating an interline CCD device having an image sensing area with a plurality of photodiodes, a plurality of vertical shift registers, and a horizontal shift register adjacent the image sensing area, the horizontal shift register being configured such that it has a greater charge storage capacity than the vertical shift registers, such that the CCD device can store data representative of an image;

placing at least one marker storage area within at least one double width vertical shift register within the CCD device, the double width vertical shift register having a storage capacity that allows more storage of charge than is possible with the vertical shift registers;

filling the marker storage area with charge via an injection diode operatively coupled to the double width vertical shift register; and shifting the charge within the marker storage area at a predetermined time along a predetermined path through the horizontal shift register, to exit the CCD as an electrical signal measurably greater than a typical video signal.

2. The method of claim 1 wherein the step of shifting further comprises shifting the potential within the marker storage area at a predetermined time to the horizontal shift register.

3. The method of claim 1 wherein the step of placing the marker storage area further comprises strategically placing the extra wide shift registers within the CCD.

4. The method of claim 3 wherein the step of placing further comprises placing a plurality of marker storage areas within the CCD.

5. The method of claim 1 wherein the step of placing further comprises using modified doping profiles to increase charge capacity of specific areas of the CCD.

6. The method of claim 1 wherein the step of shifting charge within the marker storage area further comprises shifting charge towards the same exit taken by image data from typical pixels.

7. The method of claim 1 wherein the step of shifting charge within the marker storage area further comprises shifting charge to exit the CCD along a different path taken by image data from typical pixels.

8. The method of either one of claims 1, 6 or 7 wherein the step of placing further comprises placing a plurality of marker storage areas within the CCD.

9. An image sensing device capable of generating marker pixels comprising:

a charge coupled device having an image sensing region with a plurality of photodiodes operatively coupled to a plurality of vertical shift registers and at least one horizontal register adjacent to the image sensing region such that the horizontal shift register has a higher charge storage capacity than the vertical shift registers;

at least one marker storage area within at least one double width vertical shift register with a charge capacity greater than a well within the vertical shift registers coupled to the photodiodes;

charging means, including an injection diode operatively coupled to the double width vertical shift register, for essentially filling the marker storage area; and transfer means for shifting charge from the storage area along a predetermined path to exit the CCD as an electrical signal that is measurably greater than a typical electrical signal.

10. The invention of claim 9 wherein the charging means comprises at least one injection diode and the marker storage area is covered by a light shield.

11. The invention of claim 9 wherein the double width vertical register is an additional register.

12. The invention of claim 9 wherein the charge represents an end of line pixel marker.

13. The invention of claim 9 further comprising a plurality of marker pixels within the marker storage area to indicate an end of line condition coinciding with an end of field condition.

14. The invention of claim 9 wherein the marker storage area charge represents an end of field pixel marker.

* * * * *